United States Patent
Bury et al.

(10) Patent No.: US 9,860,610 B2
(45) Date of Patent: Jan. 2, 2018

(54) METHOD AND SYSTEM FOR DYNAMIC DISPLAY OF AT LEAST ONE VIDEO ADVERTISEMENT IN AN INTERNET PAGE INTENDED TO BE VIEWED BY A USER

(71) Applicant: MEDIABONG, Paris (FR)

(72) Inventors: Laurent Bury, Bretten (FR); Pierre Claudon, Vandoeuvre (FR)

(73) Assignee: MEDIABONG, Paris (FR)

( * ) Notice: Subject to any disclaimer, the term of this patent is extended or adjusted under 35 U.S.C. 154(b) by 0 days.

(21) Appl. No.: 15/142,973

(22) Filed: Apr. 29, 2016

(65) Prior Publication Data

US 2017/0289642 A1  Oct. 5, 2017

(30) Foreign Application Priority Data

Mar. 31, 2016 (FR) ...................................... 16 52817

(51) Int. Cl.
| | |
|---|---|
| *G06F 17/00* | (2006.01) |
| *H04N 21/81* | (2011.01) |
| *H04L 29/08* | (2006.01) |
| *G06F 17/21* | (2006.01) |
| *G06F 17/22* | (2006.01) |
| *G06F 17/27* | (2006.01) |
| *G06Q 30/02* | (2012.01) |
| *G06F 17/30* | (2006.01) |

(52) U.S. Cl.
CPC ......... *H04N 21/812* (2013.01); *G06F 17/211* (2013.01); *G06F 17/2247* (2013.01); *G06F 17/27* (2013.01); *G06F 17/30867* (2013.01); *G06Q 30/0277* (2013.01); *H04L 67/02* (2013.01); *H04L 67/20* (2013.01); *H04L 67/22* (2013.01)

(58) Field of Classification Search
CPC ..................... G06F 17/30867; G06F 17/30905
See application file for complete search history.

(56) References Cited

U.S. PATENT DOCUMENTS

| | | | | |
|---|---|---|---|---|
| 9,641,888 | B2 * | 5/2017 | Kerns | ................ H04N 21/4312 |
| 2003/0046152 | A1 * | 3/2003 | Colas | ..................... G06Q 30/02 705/14.49 |
| 2003/0088832 | A1 * | 5/2003 | Agostinelli | ............ G06Q 30/02 715/273 |
| 2008/0163071 | A1 * | 7/2008 | Abbott | .................. G06Q 30/02 715/748 |

(Continued)

*Primary Examiner* — Laurie Ries

(74) *Attorney, Agent, or Firm* — The Marbury Law Group, PLLC

(57) ABSTRACT

Method of dynamic display of at least one video advertisement in an Internet page intended to be viewed by a user, comprising the following steps:
- information identifying the Internet page is determined,
- at least one video location in which the video advertisement is to be displayed in the Internet page is determined by analyzing the page layout of the Internet page as a function of the source code of the Internet page or as a function of a predefined heuristic algorithm, and by determining at least one location as a function of the page layout and of predefined rules,
- at least one video advertisement to be displayed is determined as a function of the information identifying the Internet page, and
- the display of the video advertisement is commanded as a function of the determined positions of the video locations.

10 Claims, 4 Drawing Sheets

(56) References Cited

U.S. PATENT DOCUMENTS

Figure 1:
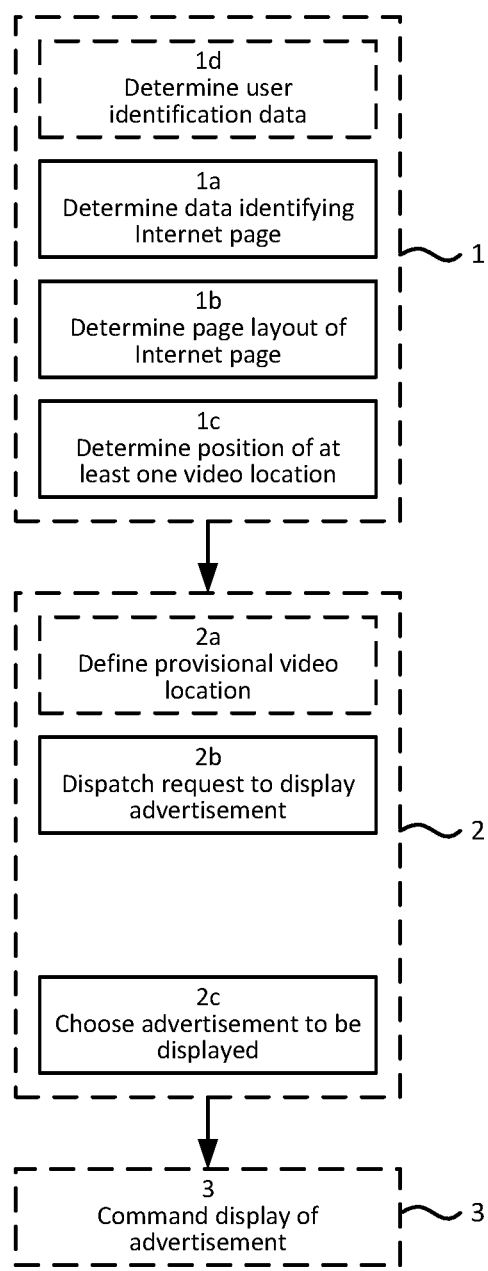

| | | | | |
|---|---|---|---|---|
| 2008/0244391 A1* | 10/2008 | Menachem | G06F 3/0481 | 715/273 |
| 2008/0281689 A1* | 11/2008 | Blinnikka | G06Q 30/0264 | 705/14.61 |
| 2009/0287567 A1* | 11/2009 | Penberthy | G06F 17/30 | 705/14.43 |
| 2010/0153831 A1* | 6/2010 | Beaton | G06Q 30/02 | 715/201 |
| 2010/0262490 A1* | 10/2010 | Ito | G06Q 30/02 | 705/14.49 |
| 2010/0306249 A1* | 12/2010 | Hill | G06F 17/30867 | 707/769 |
| 2012/0093481 A1* | 4/2012 | McDowell | G11B 27/105 | 386/241 |
| 2012/0311420 A1* | 12/2012 | Penberthy | G06F 17/30 | 715/205 |
| 2013/0132042 A1* | 5/2013 | Chan | G06F 17/50 | 703/1 |
| 2014/0208199 A1* | 7/2014 | Peleg | G06Q 30/0277 | 715/234 |
| 2014/0337147 A1* | 11/2014 | DaSilva | G06Q 30/0241 | 705/14.73 |
| 2014/0372210 A1* | 12/2014 | Watfa | G06Q 30/0251 | 705/14.49 |
| 2015/0026718 A1* | 1/2015 | Seyller | H04N 21/4316 | 725/34 |
| 2015/0046268 A1* | 2/2015 | Abbott | G06Q 30/02 | 705/14.66 |
| 2015/0051987 A1* | 2/2015 | Greif | G06Q 30/0276 | 705/14.72 |
| 2015/0161653 A1* | 6/2015 | Raichelgauz | G06Q 30/0242 | 705/14.41 |
| 2015/0248698 A1* | 9/2015 | Bhattacharjee | G06Q 30/0256 | 705/14.54 |
| 2016/0189201 A1* | 6/2016 | Shao | G06Q 30/0243 | 705/14.42 |
| 2016/0227297 A1* | 8/2016 | Bennett | H04N 21/812 | |
| 2016/0295255 A1* | 10/2016 | Steelberg | G06Q 30/02 | |

* cited by examiner

METHOD AND SYSTEM FOR DYNAMIC DISPLAY OF AT LEAST ONE VIDEO ADVERTISEMENT IN AN INTERNET PAGE INTENDED TO BE VIEWED BY A USER

This application claims the benefit of French Patent Application No, 1652817 entitled "Procédé et système d'affithage dynamique d'au moins une publicité vidéo, dans Line page Internet destinée à être vue par un utilisateur" filed on Mar. 31, 2016, the entire contents of which are hereby incorporated by reference for all purposes.

The technical field of the invention is the broadcasting of video contents in Internet pages, and more particularly the broadcasting of video advertisements as a function of the user's behaviour.

Internet sites and applications, in particular mobile applications for smartphones comprise documents or pages (generally in the html format), that can marry several types of contents such as texts, images, and videos, arising both from editorial contents specific to the site and from advertising contents generally arising from third-party providers of video advertisements.

In the particular case of advertising contents in the form of videos, they can be inserted manually and statically or dynamically into the said pages.

Generally, video contents are read by means of a video reading program. Currently, such video reading programs usually use a so-called "streaming" technology allowing real-time transfer of data making it possible to display the video without requiring the transfer of the entire video before starting the reading thereof.

Advertising systems make it possible to display a video advertisement, before, during or after the broadcasting of a video content, in the case of a so-called "in-stream" advertisement or without the support of a video content, in the case of a so-called "outstream" advertisement.

The starting of these video advertisements can be initiated actively by the user, automatically upon the display of the page, or activated by the scrolling of the page by the user.

These video advertisements can be targeted according to varied criteria, mainly according to the user's predicted or known characteristics such as socio-demographic characteristics or behavioural history.

These advertisements can be delivered in various ways: subsequent to a static call (call to a third-party Internet page comprising the advertisement from the Internet home page), a dynamic call (call to a third-party Internet page comprising the advertisement including parameters or metadata) or a call in programmatic form (real-time auctions for the use of the advertising location).

However, whatever broadcasting and starting modes are chosen, video advertisements are currently limited to predefined locations, which may no longer be situated in the user's field of vision during the scrolling of an Internet page. In such a case, the advertisement which is broadcast destined for the user is not really viewed by the latter. Falsified broadcasting statistics in particular ensue therefrom.

A need thus exists for a method and a system allowing broadcasting of video advertisements on at least one video location of an Internet page making it possible to maintain the visibility of the video advertisement during the viewing of an Internet page by the user.

The subject of the invention is a method of dynamic display of at least one video advertisement in an Internet page intended to be viewed by a user. The method comprises the following steps:

information identifying the Internet page is determined, at least one video location in which the video advertisement is to be displayed in the Internet page is determined by analysing the page layout of the Internet page as a function of the source code of the Internet page or as a function of a predefined heuristic algorithm, and by determining at least one location as a function of the page layout and of predefined rules, at least one video advertisement to be displayed is determined as a function of the information identifying the Internet page, and the display of the video advertisement is commanded as a function of the determined positions of the video locations.

To determine at least one video advertisement to be displayed, it is possible to carry out the following steps:

if it has been determined that the Internet page comprises at least one video location, a provisional video location is defined, in which a video reading program is activated, a request for advertisement to be displayed is dispatched as a function of the information identifying the Internet page, the advertisement to be displayed is received back, the reading of the advertisement to be displayed is started by way of the video reading program and reading is paused, and then the video program is moved from the provisional location to the video location of the Internet page and the reading of the advertisement is resumed.

To determine at least one video advertisement to be displayed, it is alternatively possible to carry out the following steps:

if it has been determined that the Internet page comprises at least one video location, a provisional video location is defined, in which a video reading program is activated, a request for advertisement to be displayed is dispatched as a function of the information identifying the Internet page, and, simultaneously, the video program is moved from the provisional location to the video location of the Internet page, the advertisement to be displayed is received back, the reading of the advertisement to be displayed is started by way of the video reading program.

To command the display of the video advertisement, it is possible to determine the movement of the user's field of view with respect to the Internet page, as soon as a movement is detected, it is determined whether the video location comprising the video advertisement satisfies visibility criteria.

The visibility criteria of a location can comprise a threshold value of the ratio of the surface area of the location divided by the surface area of the location visible to the user.

It is possible to determine the user's field of view, it is possible to determine the part of the Internet page entering the user's field of view, and it is possible to determine whether the visibility criteria of the location are satisfied as a function of the respective positions of the location in the Internet page and of the position of the part of the Internet page entering the field of view.

It is possible to update the part of the Internet page entering the user's field of view as a function of the part of the Internet page entering the previously determined field of view and as a function of the movement of the user on this page.

When the visibility criteria of the location comprising the video advertisement are no longer satisfied, it is possible to pause the video advertisement in this location, and then, when the visibility criteria of a location are again satisfied, it is possible to resume in this location the reading of the video advertisement which was paused.

The Internet page can comprise a first video location and at least one second video location, the first video location comprising the video advertisement. The method can then comprise the following steps:

when the visibility criteria of the first video location are no longer satisfied, the video advertisement is paused, and then when the visibility criteria of a second location are satisfied, the video advertisement which was paused in the first location is resumed in the second location.

A video location can be either inserted into the content of the Internet page or overlaid on the content of the Internet page.

It is possible to determine locally or on a remote server the information identifying the Internet page and/or at least one video content to be displayed.

The subject of the invention is also a system for dynamic display of at least one video advertisement in an Internet page intended to be viewed by a user, comprising a script included in the Internet page, able to determine information identifying the Internet page, and to determine at least one video location in which the video advertisement is to be displayed in the Internet page by analysing the page layout of the Internet page as a function of the source code of the Internet page or as a function of a predefined heuristic algorithm, and by determining at least one location as a function of the page layout and of predefined rules, a video reading program executed by the user able to request the advertisement to be displayed and command the display of the video advertisement in the Internet page, and an advertising platform is able to receive the requests of video advertisements of the video reading program, to address advertisement requests to third-party providers of video advertisements and to send a video advertisement or a list of video advertisements destined for the video reading program on the basis of the information identifying the Internet page and the page layout of the Internet page which were received from the script by way of the video reading program.

Figure 2:
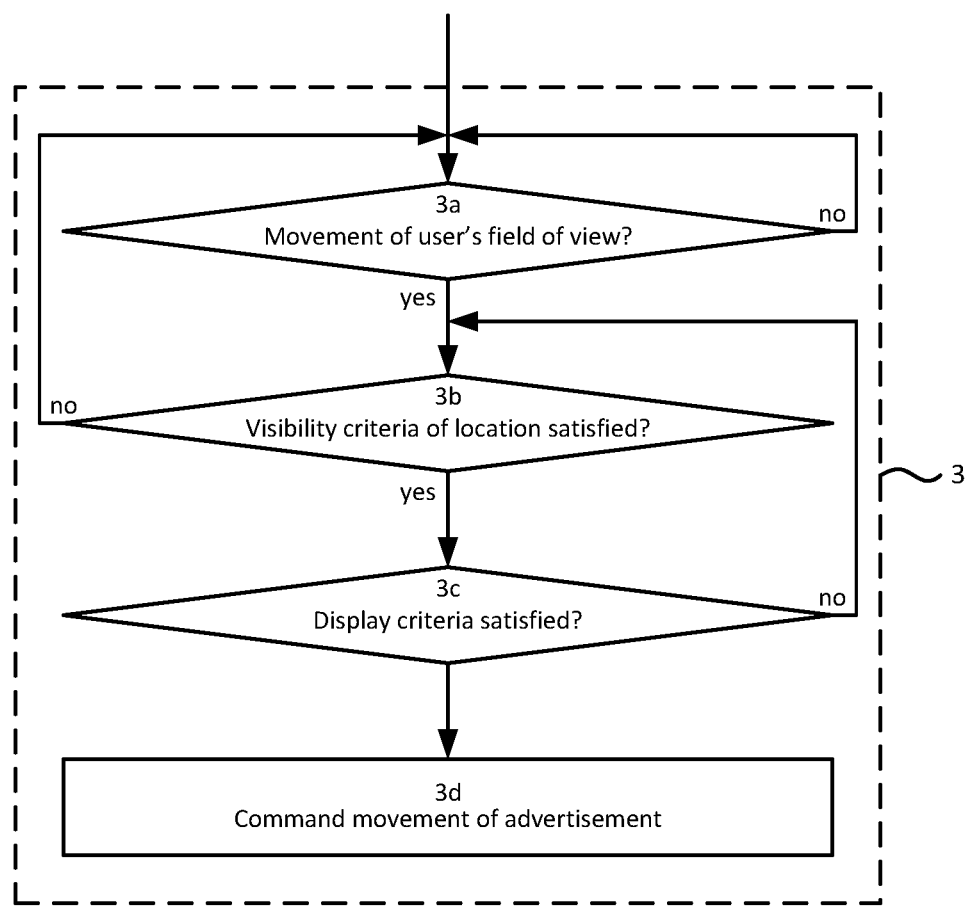
Figure 3:
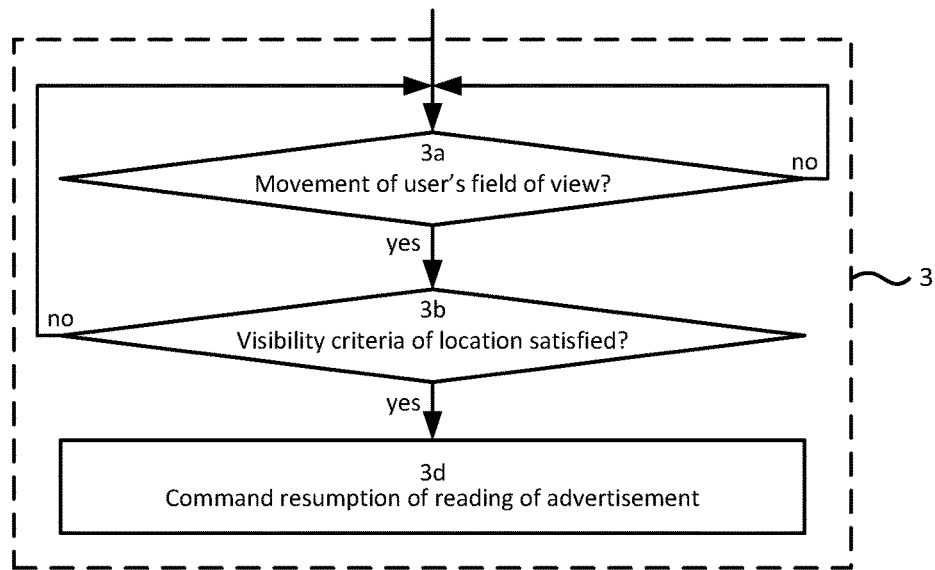
Figure 4:
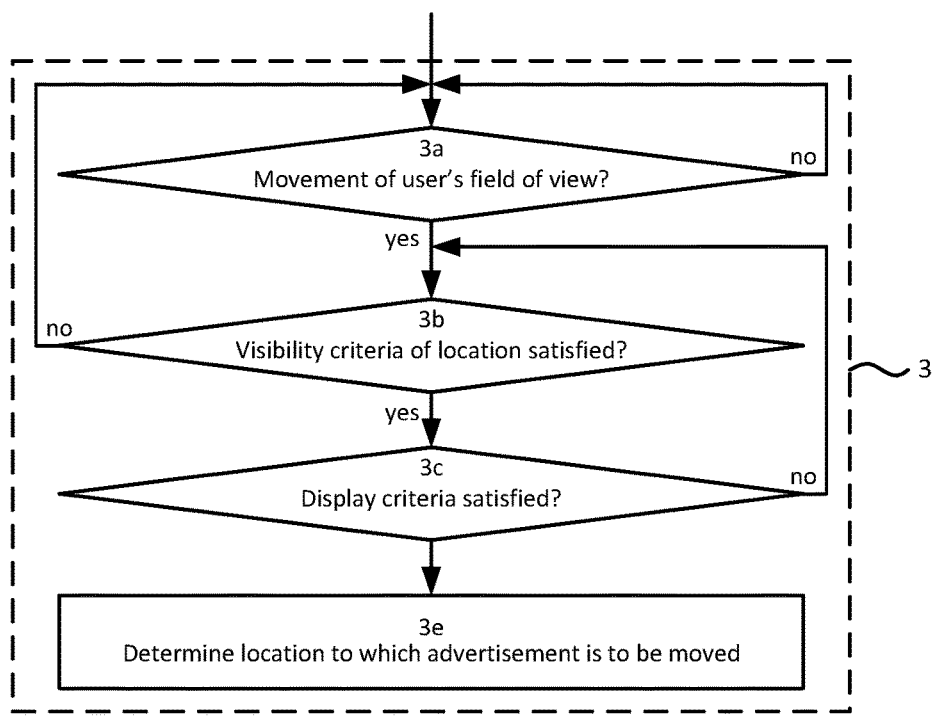
Figure 5:
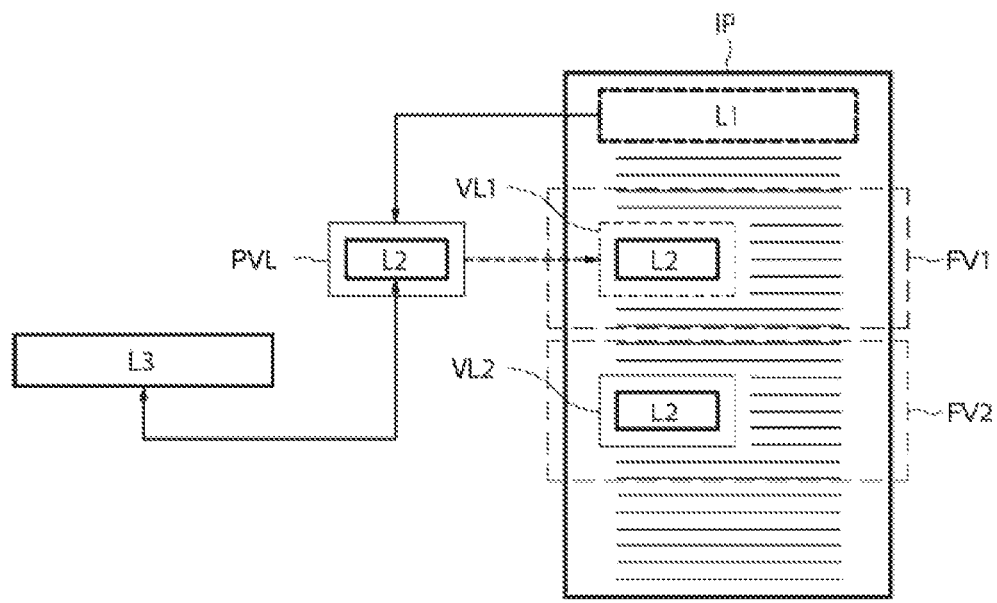
Figure 6:
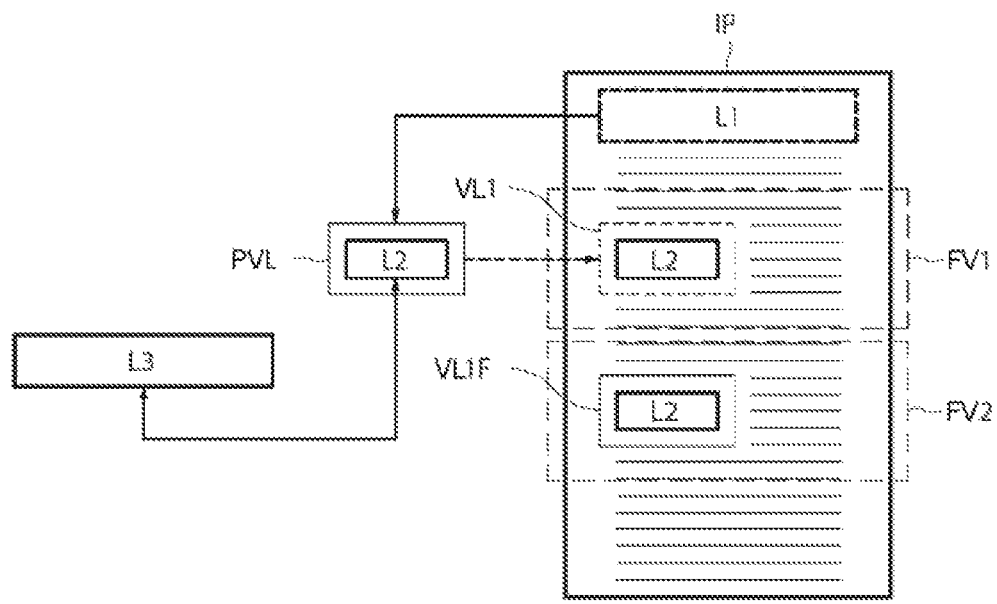

Other aims, characteristics and advantages of the invention will become apparent on reading the following description, given solely by way of nonlimiting example and with reference to the appended drawings in which:

FIG. 1 illustrates the main steps of the method according to the invention,

FIG. 2 illustrates a first embodiment of the third step of command of the display of the advertisement of the method, FIG. 3 illustrates a second embodiment of the third step of command of the display of the advertisement of the method, FIG. 4 illustrates a third embodiment of the third step of command of the display of the advertisement of the method, FIG. 5 illustrates a fourth embodiment of the third step of command of the display of the advertisement of the method, and FIG. 6 illustrates another embodiment of the third step of command of the display of the advertisement of the method.

A user, in particular a web surfer, connects to a network, in particular the Internet network, by means of an appliance (such as a computer, a smartphone, a connected television or any other suitable device). The user then sends an access and viewing request destined for an Internet page. The user receives back data allowing the display of the Internet page on the appliance used to connect to the network, as well as the interaction of the user with the page. The alternation of requests and of data received back continues at each new action of the user.

When the Internet page called comprises the method according to the invention, the method communicates with an advertising platform able to deliver an advertisement or to call upon one or more third-party providers of video advertisements. The platform selects, if appropriate, a video advertisement and transmits it to the method according to the invention, included in the Internet page.

The said video advertisement is displayed in at least one video location of the Internet page. As a function of the behaviour of the user on the Internet page, the display of this advertisement will be able to be modified, for example moved between several video locations or paused so as to be resumed subsequently, as a function of the Internet page concerned and of visibility and display criteria, comprising in particular the visibility of the advertisement on the user's screen. This video advertisement can also be continued dynamically from one video location of the page to another by way of a synchronization.

In FIG. 1 may be seen the main steps of the method of dynamic display according to the invention. The method comprises a first step 1 of determining the position of video locations in the Internet page, a second step 2 of determining the advertisement to be displayed, and a third step 3 of command of the display of the advertisement as a function of the determined positions of the video locations and of the behaviour of the user.

The first step 1 of determining the position of video locations in the Internet page itself comprises several sub-steps.

In the course of a first sub-step 1a, data identifying the Internet page are determined. The data identifying the Internet page can be its Internet address, its owner, its date, its context, its topics or semantic characteristics or an internal reference of the advertising platform with which the method communicates.

In the course of a second sub-step 1b, the page layout of the Internet page is determined in a static or dynamic manner. The page layout is determined statically by examining the computer code describing the formatting of the Internet page (for example html code, css code etc.) so as to pinpoint there elements, titles, tags, paragraphs, etc. making it possible to identify according to pre-established rules whether a location is compatible in respect of the display of a video advertisement.

The page layout is determined dynamically by using a heuristic algorithm making it possible to deduce from the computer code of the Internet page and the formatting of the Internet page the position of its main component elements, and to identify whether a location is compatible in respect of the display of a video advertisement.

To do this, it is possible to identify blocks containing text and to determine the absolute and relative position of the text blocks in the page.

Among the text blocks determined, in an exclusive manner or in synergy with the other conditions of determination, paragraphs are determined as being long text blocks comprising at least a first quantity of words, for example ten words. This makes it possible not to consider the text blocks which could be read quickly by the user, or which are not significant in terms of page layout.

Among the text blocks determined, it is also possible to determine, in an exclusive manner or in synergy with the other conditions of determination, paragraphs as being text blocks comprising fewer than a first fraction of hypertext links, or fewer than a second fraction greater than the first fraction of hypertext links if the text block considered is preceded and followed by long text blocks. This also makes it possible not to consider the text blocks which could distract the user by redirecting him to other Internet pages. In the case of a redirection, the advertising video might not be viewed by the user.

Among the text blocks determined, it is also possible to determine, in an exclusive manner or in synergy with the other conditions of determination, paragraphs as being determined text blocks, followed by at least one "separator" element (such as <p>, <div> in the html programming language).

Moreover, it is identified whether the Internet page comprises elements of hierarchization of the information (tag H1, H2, . . . Hn) as well as their positions. In such a case, each relevant text block situated immediately before a hierarchization element comprises the hierarchical element to which the hierarchization element makes reference.

In the course of a third sub-step 1c, the positioning of at least one video location in the Internet page is determined as a function of the information in respect of page layout defined in the second sub-step 1b.

In particular, the possible video locations are determined as a function of the number of paragraphs, of their position in the page and of the user's field of view. The following rules illustrate an example of video location determination.

It is determined that the first video location is situated immediately after the first paragraph determined which does not comprise an image or a video, or which is not immediately followed by an image or a video.

It is determined that the following video locations are situated after a paragraph, at an equal distance from at least one field of view of the preceding video location. If the length of the page is insufficient to fulfil this condition, it is determined that the last video location is situated after the last paragraph.

In a variant, if the length of the page is less than the user's field of view, the second video location corresponds to a floating video location or is deleted.

An alternative embodiment of the first step 1 comprises a third sub-step 1d carried out before the first sub-step 1a. In the course of the third sub-step 1d, user identification data are determined. The user identification data can be a unique identifier of the Internet browser employed included for example in a cookie previously posted on the user's station by the advertising platform or an authorized third party, other technologies of identification (such as for example the "fingerprint", the recovery of information from the browser or from the user's station comprising for example the identification of the user's appliance (computer, tablet, smartphone, TV etc.), of his geolocation, of his "user-agent".

The "fingerprint" is defined as a scheme making it possible to identify a user according to the characteristics of his Internet browser, of the operating system allowing the execution of the browser, of extra modules ("plugins") for the said browser, etc. The "fingerprint" generates a unique print based on a combination of several elements: list of the plugins of the browsers, list of the fonts installed on the computer, user agent of the browser, resolution of the screen, time configuration of the machine (and others also, which vary regularly).

A "user-agent" is defined as a string of characters making it possible to identify a browser. For example, the user agent "Mozilla/5.0 (Windows NT 10.0; WOW64) AppleWebKit/537.36 (KHTML, like Gecko) Chrome/48.0.2564.109 Safari/537.36 FirePHP/4Chrome" represents a "Google Chrome" browser of version 48.0.2564.109, using the webkit v. 537.36 engine and the firePHP 4 plugin, the whole being executed in Windows 10.

The second step 2 of determining the advertisement to be displayed commences with a first sub-step 2a. In the course of this first sub-step 2a, if it has been determined that the Internet page comprises at least one video location, a provisional video location in which the video reading program L2 is activated is defined.

The provisional video location is disposed in a zone of the Internet page which is not visible to the user. This makes it possible, in the case where no video advertisement is available, not to impair the page layout of the Internet page viewed by the user.

This can be done, in the case of an HTML-coded Internet page, by creating a new division ("div") with negative margins. The video reading program is loaded into this provisional video location with an absolute position with respect to the page (as opposed to a relative position with respect to an element of the page) so as to be able to be moved subsequently to any desired position of the page without having to reload the video reading program.

The method continues in the course of a second sub-step 2b, in the course of which a request for advertisement to be displayed is dispatched, for example to an advertising platform, as a function of the Internet page identification information. The platform can return the information of one or more video advertisements to be displayed and their order of broadcasting. When several video advertisements are to be displayed, the method continues in the course of a third sub-step 2c, in the course of which the advertisement to be displayed is chosen.

The video reading program calls upon the first video advertisement of the list. If the latter is ready to be broadcast, the program pauses it. If it is not valid or if the response time to the call is excessive, it passes to the following advertisement in the list until it finds an advertisement that is ready to be broadcast.

The video reading program is then moved from the provisional video location to the video location of the Internet page and reading of the video advertisement is resumed.

Another embodiment of step 2 of determining the advertisement to be displayed will now be described.

In the course of a first sub-step 2a, if it has been determined that the Internet page comprises at least one video location, then a provisional video location in which the video reading program L2 is activated is defined.

The provisional video location is disposed in a zone of the Internet page which is not visible to the user. This makes it possible, in the case where no video advertisement is available, not to impair the page layout of the Internet page viewed by the user.

This can be done, in the case of an HTML-coded Internet page, by creating a new division ("div") with negative margins. The video reading program is loaded into this provisional video location with an absolute position with respect to the page (as opposed to a relative position with respect to an element of the page) so as to be able to be moved subsequently to any desired position of the page without having to reload the video reading program.

The method continues in the course of a second sub-step 2b, in the course of which a request for advertisement to be displayed is dispatched, for example to an advertising platform, as a function of the Internet page identification information and, simultaneously, the video reading program is moved from the provisional video location to the video location of the Internet page.

The platform can return the information of one or more video advertisements to be displayed and their order of broadcasting. When several video advertisements are to be displayed, the method continues in the course of a third sub-step 2c, in the course of which the advertisement to be displayed is chosen.

The video reading program calls upon the first video advertisement of the list and commences its display if the latter is ready to be broadcast. If it is not valid or if the response time to the call is excessive, it passes to the following advertisement in the list until it finds an advertisement that is ready to be broadcast.

Alternatively, the second sub-step 2b comprises the dispatching of a request for advertisement to be displayed as a function of the Internet page identification information and of the user identification information.

FIG. 2 illustrates a first embodiment of the third step 3 of command of the display of the advertisement to be displayed as a function of at least one video location and of the behaviour of the user. It comprises a first sub-step 3a of determining a movement of the user's field of view. The method remains in the third sub-step 3a and executes it in a loop as long as a movement is not determined.

As soon as a movement is detected, the method continues with a second sub-step 3b of determining the visibility of the video location comprising the advertisement as a function of predetermined visibility criteria. Among such criteria may be cited a threshold value of the ratio of the surface area of the location divided by the surface area of the location visible to the user.

To do this, the user's field of view is determined, the part of the Internet page entering the user's field of view is determined, and it is determined whether the visibility criteria of the location are satisfied as a function of the respective positions of the location in the Internet page and of the position of the part of the Internet page entering the field of view. The person skilled in the art will understand that the user's field of view is determined by the resolution of the display device, combined with the scale ratio or zoom employed. On a computer, the display device is for example the screen or a video projector. On a smartphone, it is generally the screen.

If it is determined that the visibility criteria are not satisfied, the method resumes in the first sub-step 3a of determining a movement of the user's field of view If it is determined that the visibility criteria are satisfied, the method continues with a third sub-step 3c of determining satisfaction of display criteria.

Such display criteria comprise too fast a movement of the user, too low a mean degree of visibility of the video location, the closing of the video reading program in the video location, or the profile of the user and his behavioural history regarding advertisements.

If such display criteria are not satisfied, the method resumes in the second sub-step 3b of determining the visibility of the video location comprising the advertisement.

If the display criteria are satisfied, the method continues with a fourth sub-step 3d of command of the display of the advertisement in at least one video location.

In the course of this fourth sub-step 3d, the movement of the advertisement from the temporary video location to the video location satisfying the display criteria and the starting of the advertisement are commanded.

FIG. 3 illustrates a second embodiment of the third step 3 of command of the display of the advertisement, similar to the first embodiment, and in which similar elements bear the same references. It differs from the first embodiment on account of the absence of sub-step 3c of determining satisfaction of display criteria. It also differs from the first embodiment on account of the pausing of the advertisement as soon as the video location comprising the advertisement no longer satisfies the visibility criteria and the resumption of the advertisement as soon as the visibility criteria are satisfied again.

To do this, when in the course of the second sub-step 3b it is detected that the video location comprising the advertisement no longer satisfies the visibility criteria, the method continues to the fourth sub-step 3d which then commands the pausing of the advertisement.

The method then resumes in the second sub-step 3b so as to determine whether the video location comprising the advertisement satisfies the visibility criteria again. If such is the case, the method continues to the fourth sub-step 3d which then commands the resumption of the reading of the advertisement.

FIG. 4 illustrates a third embodiment of the third step 3 of command of the display of the advertisement, similar to the first embodiment, and in which similar elements bear the same references In contradistinction to the first embodiment, the Internet page comprises several video locations for each of which the satisfaction of the visibility and display criteria is determined in the course of sub-steps 3b and 3c.

The method then determines, in the fourth sub-step 3d, to which video location the advertisement must be moved from the temporary video location. Still in the course of the fourth sub-step 3d, it is determined, as a function of the movement of the user's field of view whether the video location comprising the video satisfies the visibility and display criteria. If such is not the case, the pausing of the advertisement is commanded and its transfer to another video location better satisfying the visibility and display criteria is commanded. The resumption is thereafter commanded of the reading of the advertisement in the other video location at the instant at which it was paused.

The fourth embodiment is a variant of the third embodiment in so far as the advertisement is moved to a floating video location overlaid on the content of the Internet page as soon as the video location comprising the advertisement no longer satisfies the display criteria. The floating video location is a video location whose position relates to the user's field of view as opposed to the other video locations whose position relates to the Internet page.

As soon as it is determined that a video location other than the floating video location satisfies the display criteria, the advertisement is transferred from the floating video location to the video location satisfying the display criteria.

The method described hereinabove can be executed locally on the user's computer, remotely on servers remote from the user's computer, which are situated for example in the advertising platform, or by a combination of local and remote executions.

In particular, the invention can comprise a "script", a video reading program and an advertising platform, which are present in FIGS. 5 and 6 which illustrate their operation in embodiments involving the transfer of the video advertisement from a location comprising the video advertisement to respectively a second video location or a floating video location, both of which satisfy the display criteria whilst the field of vision of the user has passed from a first position FV1 to a second position FV2.

A program making it possible to manipulate the functionalities of a computer system is called a "script". In the present case, the script makes it possible to manipulate the constituent elements of a web page so as to add thereto a video reader as well as various locations making it possible to accommodate this video reader.

For example, <script type='text/javascript'>var container=document.createElement("div"); document.body.appendChild(container);</script> is a script making it possible to add an HTML element (type: div) at the end of the html page in which it is executed.

The "script" referenced L1 is developed in a programming language compatible with the Internet page in which it is installed, with the user's appliance displaying the Internet page, and the associated software (for example, the Internet browser). Javascript, objective-C, and the java language may be cited for example as programming language.

The script L1 carries out in particular the Internet page information collection and page layout analysis actions carried out in the course of the first two steps of the method. In another embodiment, the script L1 can comprise the identification of the web surfer from among the information collected.

The video reading program referenced L2 is a piece of software, which can be developed communally via the Flash and/or HTML5 programming languages and which allows the reading of a video.

The video reading program L2 comprises a component making it possible to manage the metadata and parameters of the advertisements (and can therefore in particular be compatible with the VAST and/or VPAID standards customarily used).

It can also comprise a component making it possible to manage a list of advertisements, and to pass to the following advertisement in the list if the advertisement to be displayed turns out not to be compatible or to present a problem (for example, unavailability, network latencies preventing it from retrieving all or part of the video file in satisfactory times).

The format of the video file can in particular be mpeg4, H26x, fly, etc. The format is limited only by the programming of the video reading program.

In the course of the requesting of video advertisements from an advertising platform L3 and of the reading of the advertisement (or of its pausing), the video reading program L2 can also notify statistical events (such as the starting of the video advertisement, the visibility of the video in the page, the clicking on the advertisement, etc.) to the platform L3 or directly to third-party applications, defined in the parameters of the video advertisement.

When the video reading program L2 is called in a video location PVL,VL1,VL2,VL1F, it redimensions itself to the defined size of the location. To redimension itself, it adopts the width of the location and a height which is determined so as to comply with a width/height ratio of the video or a predefined width/height ratio, for example 16/9.

The advertising platform referenced L3 is a piece of software disposed on a remote server (or distributed over several servers for response time or performance reasons) and accessible via a network, in particular the Internet network.

The advertising platform L3 can make it possible to collect, update and address the criteria pertaining to the information relating to the Internet page, as well as optional third-party information. In another embodiment, the advertising platform L3 can comprise the identification of the web surfer among the criteria taken into account. The advertising platform L3 can make it possible to collect, update and address compatible and optimum static or dynamic criteria of video location in the Internet page.

The advertising platform L3 can receive advertisement requests from the video reading program and respond thereto, address advertisement enquiries integrating complementary targeting information to third-party providers of video advertisements, and receive and process their responses.

The advertising platform L3 can select the advertisement or generate a list of advertisements on the basis of the advertisements received from the providers and the data collected and by way of a predefined algorithm The advertising platform L3 can collect the statistical tracking events addressed by the video reading program during advertisement broadcasting.

In FIGS. 5 and 6 may be seen an Internet page comprising a script L1 able to determine identification data in respect of the user, identification data in respect of the Internet page as well as the page layout of the Internet page. The script L1 communicates the page layout information to the advertising platform L3 so as to determine the presence of video locations in which the video advertisement can be displayed.

The script L1 then triggers the creation of a provisional video location PVL so that it cannot be viewed by the user and that it does not disturb the page layout of the Internet page. In this provisional video location PVL, the script L1 triggers the loading of the video reading program L2 and transmits the information collected to it.

The video reading program L2 then determines the advertisement to be displayed. To do this, the video reading program L2 dispatches a request for advertisement to be displayed, for example to an advertising platform L3, as a function of the Internet page identification information and of the user identification information.

The video reading program L2 receives back the information in respect of one or more video advertisements to be displayed and their order of broadcasting. When several video advertisements are to be displayed, the video reading program L2 determines the advertisement to be displayed.

The video reading program calls upon the first video advertisement of the list. If the latter is ready to be broadcast, the program pauses it. If it is not valid or if the response time to the call is excessive, it passes to the following advertisement in the list until it finds an advertisement ready to be broadcast.

The video reading program L2 then commands its movement from the provisional video location PVL to the video location VL1 of the Internet page and commands the resumption of the reading of the video advertisement.

In FIGS. 5 and 6, it may be seen that the user's field of view is modified from a first position FV1 of the field of view to a second position FV2 of the field of view. FIGS. 5 and 6 are distinguished by the display of the advertisement during the movement of the user's field of view.

Indeed, in FIG. 5, the video reading program L2 detects that the video location VL1 in which it is loaded no longer satisfies the display criteria on account of the movement of the field of view from the first FV1 to the second position FV2.

The program pauses the video advertisement and then determines whether other video locations satisfy the display criteria better. If it determines that a second video location VL2 satisfies the display criteria better, it moves from the first video location VL1 to the second video location VL2 and resumes the reading of the video at the instant of pausing. The video reading program thereafter continues the monitoring of the movement of the field of view and modifies its position so as to maintain optimal satisfaction of the display criteria.

FIG. 6 illustrates another embodiment in the course of which the video reading program L2 detects that the video location VL1 in which it is loaded no longer satisfies the display criteria on account of the movement of the field of view from the first FV1 to the second position FV2.

The program pauses the video advertisement and creates a floating video location VL1F situated at a relative position with respect to the user's field of view. The video reading program L2 then loads itself into the floating video location VL1F and resumes the reading of the video at the instant of pausing. Thus, whatever the movement of the user's field of view, the floating video location VL1F remains fully visible so that the display criteria are satisfied.

However, such display may be perceived as intrusive by the user. The video reading program then maintains the monitoring of the satisfaction of the display criteria by the other video locations. As soon as a video location other than the floating video location satisfies the display criteria, the video reading program pauses the reading of the video advertisement, moves to the video location satisfying the display criteria and resumes the reading of the video advertisement at the instant of pausing.

The embodiments described are not exclusive and may be combined according to implementational needs.

The invention claimed is:

1. A method of dynamic display of at least one video advertisement in an Internet page intended to be viewed by a user, comprising:
   determining information identifying the Internet page,
   determining at least one video location in which the at least one video advertisement is to be displayed in the Internet page by analysing a page layout of the Internet page as a function of source code of the Internet page or as a function of a predefined heuristic algorithm, and by determining the at least one video location as a function of the page layout and of predefined rules,
   determining the at least one video advertisement to be displayed as a function of the information identifying the Internet page, and
   displaying the at least one video advertisement as a function of the determined at least one video location, comprising determining a movement of a user's field of view with respect to the Internet page, and in response to detecting the movement of the user's field of view, determining whether the at least one video location comprising the at least one video advertisement satisfies a visibility criteria of the at least one video location, the visibility criteria comprising a threshold value of a ratio of a surface area of the at least one video location divided by a surface area of the at least one video location visible to the user.

2. The method according to claim 1, in which, determining the at least one video advertisement to be displayed comprises:
   in response to determining that the Internet page comprises at least one video location, defining a provisional video location, in which a video reading program is activated,
   dispatching a request for the advertisement to be displayed as a function of the information identifying the Internet page,
   receiving the advertisement to be displayed,
   starting then pausing the reading of the advertisement to be displayed by way of the video reading program, and
   moving the video program from the provisional location to the video location of the Internet page and resuming the reading of the advertisement.

3. The method according to claim 1, in which, determining the at least one video advertisement to be displayed comprises:
   in response to determining that the Internet page comprises at least one video location, defining a provisional video location, in which a video reading program is activated,
   dispatching a request for the advertisement to be displayed as a function of the information identifying the Internet page, and, simultaneously, moving the video advertisement from the provisional location to the video location of the Internet page,
   receiving the advertisement to be displayed,
   starting the reading of the advertisement to be displayed by way of the video reading program.

4. The method according to claim 1, in which determining the movement of the user's field of view, determining a part of the Internet page entering the user's field of view, and determining whether the visibility criteria of the at least one video location are satisfied as a function of the respective positions of the location in the Internet page and of the position of the part of the Internet page entering the field of view.

5. The method according to claim 4, in which the part of the Internet page entering the user's field of view is updated as a function of the part of the Internet page entering the previously determined field of view and as a function of the movement of the user on this page.

6. The method according to claim 1, in which, in response to determining that the visibility criteria of the video location comprising the video advertisement are no longer satisfied, the video advertisement is paused at said location, and then, in response to determining that the visibility criteria of the video location are again satisfied, the reading of the video advertisement which was paused is resumed at said location.

7. The method according to claim 1, in which the Internet page comprises a first video location and at least one second video location, the first video location comprising the video advertisement, the method further comprising:
   in response to determining that the visibility criteria of the first video location are no longer satisfied, the video advertisement is paused, and then
   in response to determining that the visibility criteria of a second location are satisfied, the video advertisement which was paused in the first location is resumed in the second location.

8. The method according to claim 1, in which a video location is either inserted into the content of the Internet page or overlaid on the content of the Internet page.

9. The method according to claim 1, in which the information identifying the Internet page and/or at least one video content to be displayed is determined locally or on a remote server.

10. A system for dynamic display of at least one video advertisement in an Internet page intended to be viewed by a user through an appliance comprising at least a processor and a display device, comprising:
    a script included in the Internet page and executed by the processor of the appliance, configured to determine information identifying the Internet page, and to determine at least one video location in which the at least one video advertisement is to be displayed in the Internet page by analysing a page layout of the Internet page as a function of source code of the Internet page or as a function of a predefined heuristic algorithm, and by determining the at least one video location as a function of the page layout and of predefined rules, a video reading program executed by the processor of the appliance configured to request the at least one video advertisement to be displayed and command the display of the at least one video advertisement in the Internet page on the display device, and an advertising platform, executed by a processor of a remote server, configured to receive the request of the at least one video advertisement of the video reading program, to address advertisement requests to third-party providers of video advertisements, and to send a video advertisement or a list of video advertisements destined for the video reading program on the basis of the information identifying the Internet page and the page layout of the Internet page received from the script by way of the video reading program, and to command the display by the video reading program of the at least one video advertisement on the display device, wherein the video reading program determines a movement of a user's field of view with respect to the Internet page, and in response to detecting the movement of the user's field of view, the video reading program determines whether the video location comprising the video advertisement satisfies visibility criteria, the visibility criteria comprising a threshold value of a ratio of a surface area of the at least one video location divided by a surface area of the at least one video location visible to the user.

* * * * *